Patented Jan. 29, 1952

2,583,549

UNITED STATES PATENT OFFICE

2,583,549

PREPARATION OF PENTAERYTHRITYL PHOSPHATES

George C. Daul and John D. Reid, New Orleans, La., assignors to the United States of America as represented by the Secretary of Agriculture No Drawing. Application April 25, 1950,
Serial No. 158,055

4 Claims. (Cl. 260—461)

(Granted under the act of March 3, 1883, as amended April 30, 1928; 370 O. G. 757)

The invention herein described may be manufactured and used by or for the Government of the United States of America for governmental purposes throughout the world, without the payment to us of any royalty thereon.

This invention relates to a class of novel chemical compounds useful as intermediates in the preparation of valuable base exchange materials, and having utility in and of themselves. It has among its objects the production of mono-pentaerythrityl phosphates as novel chemical compounds, as well as the corresponding salts thereof, and the provision of processes whereby these compounds are produced.

In accordance with our invention, phosphoric acid esters of pentaerythritol are prepared by phosphorylation of pentaerythritol in such a manner as to obtain products which have substantially all of the phosphorus only singly bound. The new compounds are capable of reacting with cellulosic materials such as cotton, alpha cellulose, and the like to produce phosphorylated derivatives of cellulose containing a high proportion of free phosphoric acid groups, by virtue of which the cellulosic derivatives possess valuable properties.

The degree of phosphorylation obtained in our novel products may be controlled by varying the molecular proportion of pentaerythritol and the phosphorylation agent employed. It is possible to vary the molecular proportions to produce mono-, di-, tri-, and tetra-phosphorylated mono-pentaerythritol as desired. It is preferable to employ a slight excess of phosphorylating agent over and above the amount theoretically required to obtain the desired degree of phosphorylation. For example, the tetra-phosphorylated compound is conveniently prepared by employing about a 15% excess of the agent.

One particular application of our invention is to produce a phosphorylated pentaerythritol suitable for subsequent reaction with cellulose to produce pentaerythrityl phosphoric acid esters of cellulose. Generally, the pentaerythrityl phosphates as a class are water soluble and do not polymerize easily. Titration of samples indicate that there are two titratable acid groups per phosphoric acid unit.

Pentaerythritol may also be phosphorylated with phosphorus oxychloride, phosphoric acid, phosphoric acid with phosphorus pentoxide, and the like. A patent has been recently issued to McLean, et al. (U. S. 2,470,042) in which is described the phosphorylation of di-pentaerythritol with phosphoric acid containing phosphorus pentoxide. However, we have found that this phosphorylating agent tends to produce doubly bound phosphoric acid compounds which are unsuited for our use. We prefer to use urea phosphate which, when it reacts with pentaerythritol, breaks up into biuret, ammonia, phosphoric acid, etc. in such a manner, under the conditions used, that only one of the phosphoric acid groups reacts with the pentaerythritol. We believe this reaction to be unique.

The reaction to be described produces the ammonium salt of pentaerythrityl phosphoric acid which may be easily crystallized from water. The purified mono-ammonium salt of pentaerythrityl tetra-phosphate forms crystals which decompose, liberating ammonia at 191–193° C. For purposes of the invention, however, the crude reaction mixture may be used in carrying out the reactions with cellulose.

The ammonium salts may be converted to the free acids by ion exchange with such acids as hydrochloric. The free acids are hygroscopic and maintain a viscous liquid state, being miscible in water, alcohol, acetone, dioxane, and similar solvents but insoluble in benzene, xylene, etc.

In accordance with our preferred method for preparing pentaerythrityl phosphates, urea phosphate and pentaerythritol are mixed, or the urea phosphate may be formed in situ in the reaction, and the mixture heated to a temperature within the range of 130° C. to 180° C. for from fifteen minutes to two hours. The time of heating varies with the temperature and with the amount of water added to the reaction mixture or the product desired. In this process, the urea phosphate is preferably added as its concentrated aqueous solution, for example, about 85%, and sufficient water is added to reduce the viscosity of the mixture to give a clear, homogeneous solution. The urea phosphate may be formed in situ in the reaction mixture by adding the proper amounts of urea and phosphoric acid as separate ingredients. The product crystallizes on cooling and may be purified by extraction with acetone to remove excess or unreacted phosphoric acid and urea (or urea-phosphate).

The following examples illustrate the invention:

Example 1

A mixture of 193.2 grams of orthophosphoric acid and 200 grams of urea (15% excess over that required for tetra-substitution) were heated to solution. To this was added 50 ml. of water and 50 grams of pentaerythritol. The mixture was heated on a hot plate until the temperature rose to 140° C. It was then transferred to an oven with air circulation and heated for two hours at 160° C. The product was dissolved in 200 ml. of hot water, filtered, and cooled.

The crude product crystallized on cooling and was extracted with hot acetone to remove impurities. It analyzed 21.3% phosphorus and 18.8% nitrogen corresponding to the diammonium salt of pentaerythrityl tetra phosphate. Theoretical: 21.0% phosphorus and 18.9% nitrogen. Converted to the barium salt, it contained 55.0% barium (theoretical: 55.4% Ba.).

*Example 2*

Fifteen grams of the product from Example 1 was put into solution with 35 ml. of water in which 15 grams of urea was dissolved. This was padded on cloth to about 100% takeup of liquid to weight of cloth, and air dried. The cloth was cured at 140° C. in an oven with air circulation for 15 minutes. It was then washed with hot water, converted to the free acid form with dilute hydrochloric acid, washed with distilled water and dried. The phosphorus content was 3.0% and total cation-exchange capacity was 1330 m. e./kg. (based on sodium hydroxide removed from 0.1 N sodium hydroxide solution). This method is described in Analytical Chemistry 21, 87, (1949).

The products are pentaerythrityl orthophosphates of the formula:

$$C(CH_2O)_4H_x(H_2PO_3)_y$$

in which $x$ and $y$ are each integers, $y$ is at least 1, and the sum of $x$ and $y$ is 4, and the ammonium, barium and other metal, and substituted ammonium salts thereof.

Having thus described our invention, we claim:

1. A method for producing pentaerythrityl phosphates which comprises heating a mixture of pentaerythritol and urea phosphate to a temperature within the range of 130° to 180° C. until evolution of water vapor ceases.

2. The process of claim 1, and treating the product with hydrochloric acid to form the free pentaerythrityl phosphoric acid.

3. The diammonium salt of mono-pentaerythrityl tetra-orthophosphoric acid.

4. An ammonium salt of a mono pentaerythrityl poly (dihydrogen orthophosphoric acid), the acid being of the formula:

$$C(CH_2O)_4H_x(H_2PO_3)_y$$

in which $x$ and $y$ are each integers, $y$ is at least 1, and the sum of $x$ and $y$ is 4.

GEORGE C. DAUL.
JOHN D. REID.

No references cited.